March 2, 1954     F. W. JAKSHA     2,671,195
POLYPHASE WELDING SYSTEM WITH TRANSFER TRANSFORMER
Filed Dec. 12, 1950     4 Sheets-Sheet 1
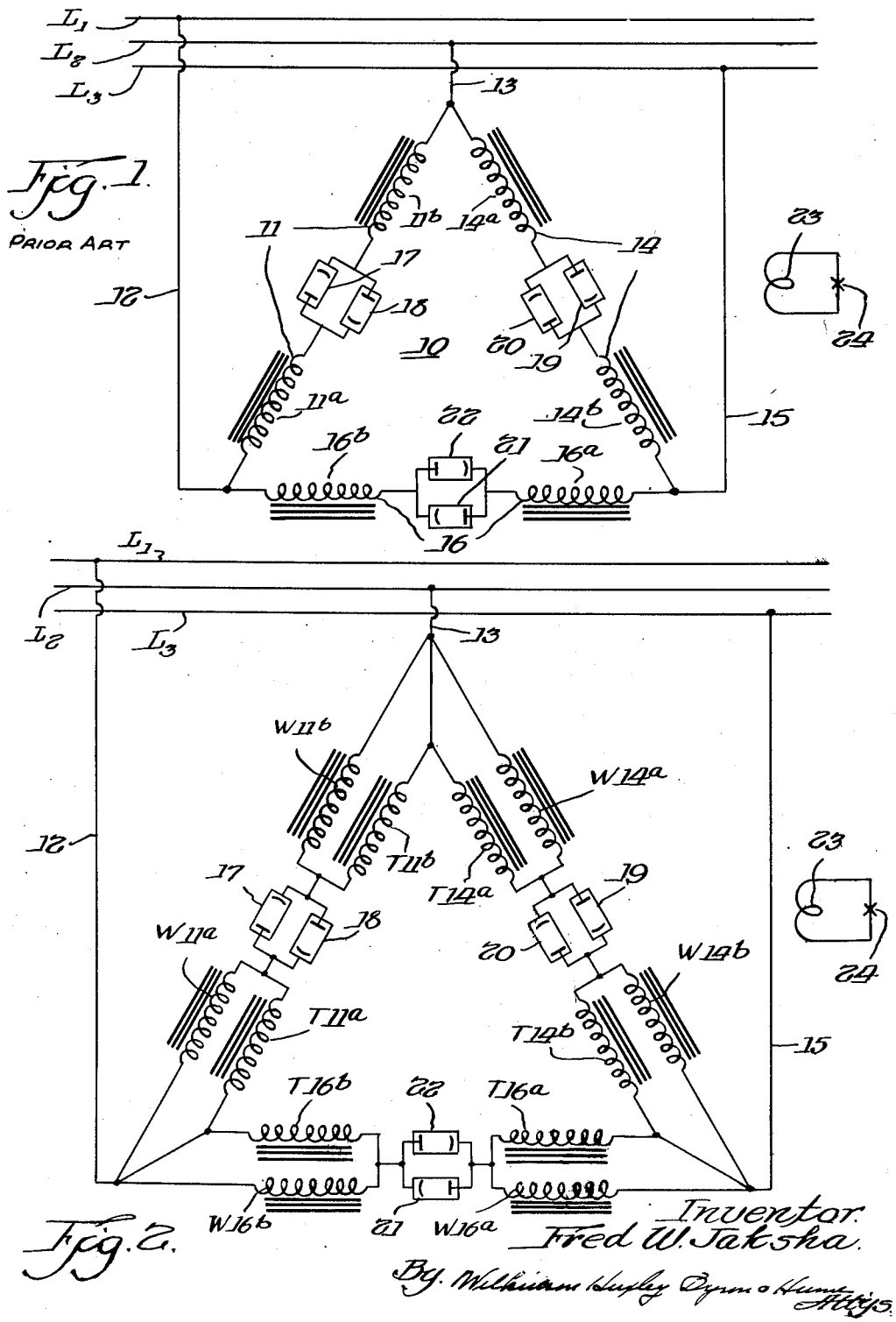

March 2, 1954  F. W. JAKSHA  2,671,195
POLYPHASE WELDING SYSTEM WITH TRANSFER TRANSFORMER
Filed Dec. 12, 1950  4 Sheets-Sheet 2

Inventor.
Fred W. Jaksha.

March 2, 1954 F. W. JAKSHA 2,671,195
POLYPHASE WELDING SYSTEM WITH TRANSFER TRANSFORMER
Filed Dec. 12, 1950 4 Sheets-Sheet 3
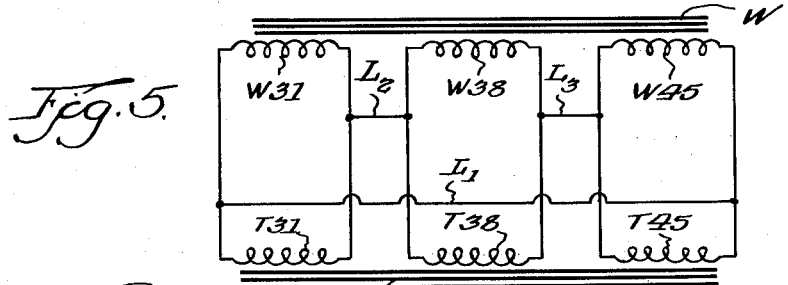
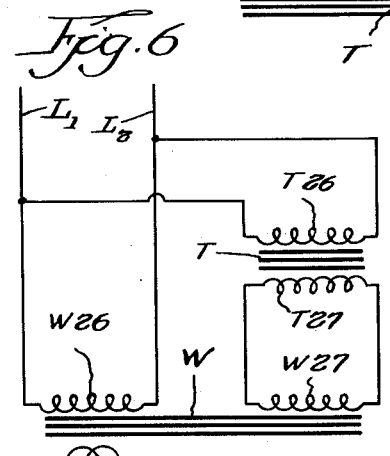
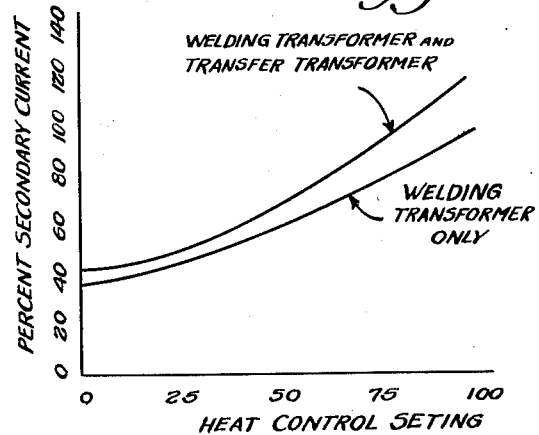
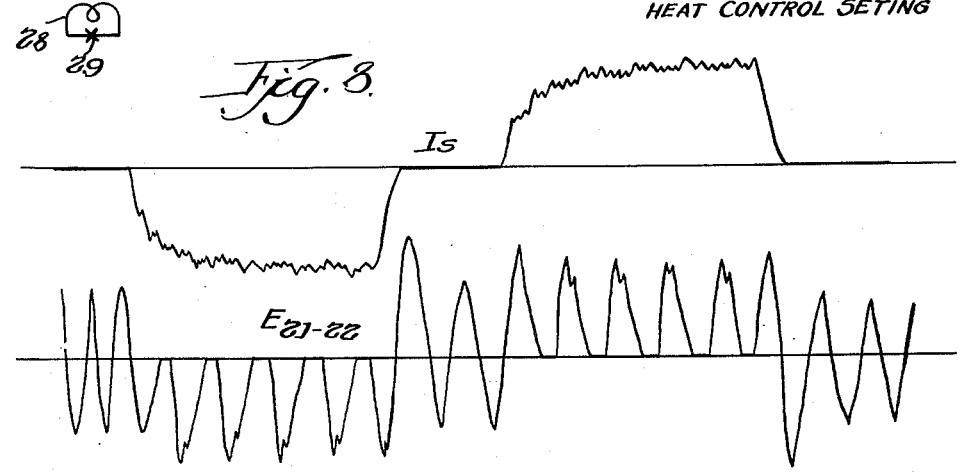
Inventor,
Fred W. Jaksha,
By Wilkinson Huxley Byron & Hume
Attys.

March 2, 1954   F. W. JAKSHA   2,671,195
POLYPHASE WELDING SYSTEM WITH TRANSFER TRANSFORMER
Filed Dec. 12, 1950   4 Sheets-Sheet 4
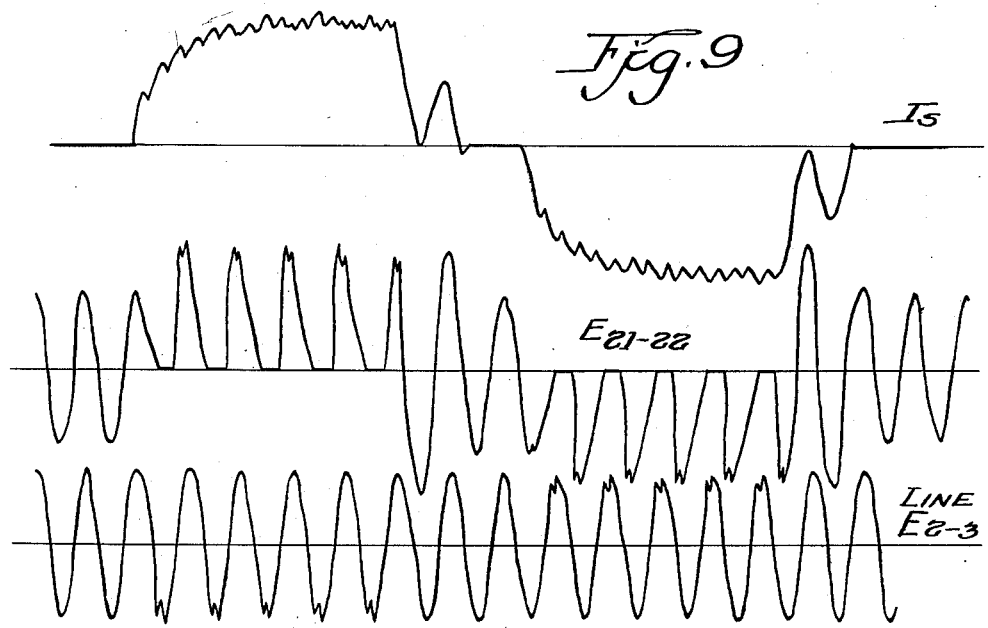
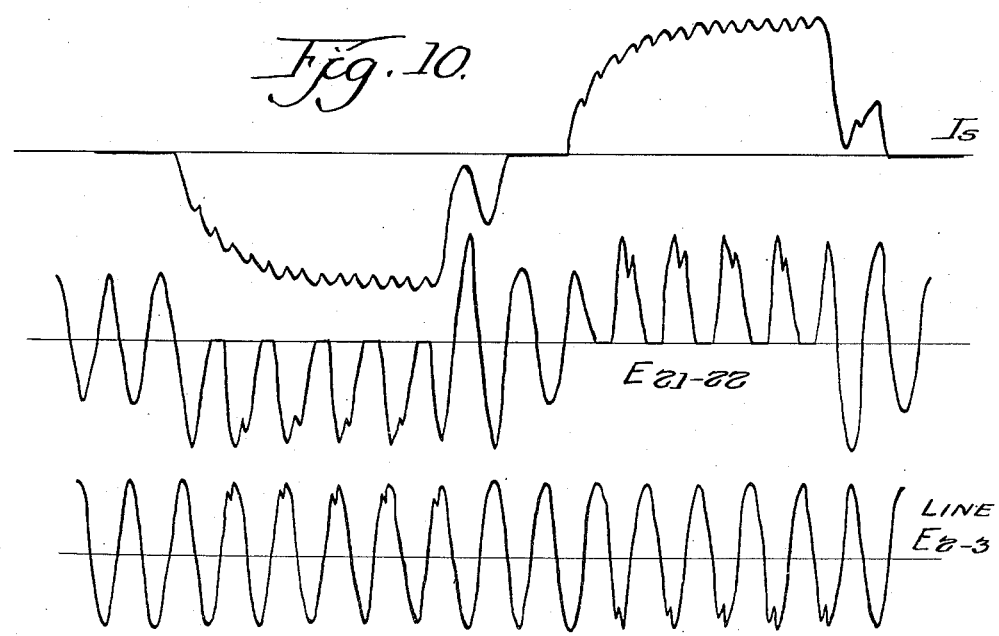

Patented Mar. 2, 1954

2,671,195

UNITED STATES PATENT OFFICE 2,671,195

POLYPHASE WELDING SYSTEM WITH TRANSFER TRANSFORMER

Fred W. Jaksha, Chicago, Ill., assignor to Welding Research, Inc., Chicago, Ill., a corporation of Illinois Application December 12, 1950, Serial No. 200,451

6 Claims. (Cl. 323—24)

The invention relates generally to the transference of electrical energy from one closed circuit to another and has more particular relation to a method and apparatus for improving the operating characteristics of a welding transformer by increasing the transformer effect through the use of a transfer transformer.

The unusual phenomenon upon which the present invention is based was observed while making comparative tests between the operation of two similar welding machines connected in parallel and with their secondaries closed so as to deliver into a common load and the operation of a single welding machine connected so as to deliver into the same load. Tests were made with the machines in parallel and with both secondaries delivering to the common load. The secondary circuit of welding machine No. 2 was then broken and oscillographic measurements were made. The results were quite different than expected. It was only after opening the primary transformer connections for machine No. 2 that the results were as expected.

By analyzing the parallel circuit connections for the two welding machines during the tests that produced the unexpected results, it will be observed that machine No. 2 functioned on the order of a transfer transformer for machine No. 1. From the results of the test it can be concluded that the employment of a second or transfer transformer in parallel with a welding transformer provides a satisfactory means of obtaining a substantial increase in the secondary current, a means of obtaining a substantial increase in the primary thermal capacity of the welding transformer, and a means of reducing the size and weight of portable welders including the three phase-three winding type.

The type of three phase welders above mentioned is well known and for an understanding of the same reference is made to the Sciaky Patent No. 2,431,083 granted November 18, 1947. In the converter system as shown in said patent, energy is drawn by a welding transformer in pulses and the same is therefore not continuous. Energy is drawn off each phase of the power system consecutively and not simultaneously. Similarly, each phase winding of the welding transformer is energized consecutively. In the case of a single phase system with a two winding transformer, each winding is energized approximately one-half the time. In the case of a polyphase system with an "N" winding transformer, each winding is energized approximately 1/Nth of the time, where N represents the number of windings in the transformer. However, when a transfer transformer is connected in parallel with such a three-phase welding transformer, the loading of each phase winding of the welding transformer is continuous and all the windings of the welding transformer carry current simultaneously. The result is to materially improve the operating characteristics of such a three-phase welder.

Accordingly, an object of the invention is to provide an improved welding system which will employ a transfer transformer in parallel circuit relation with a welding transformer to thereby secure an increase in the primary thermal capacity of the welding transformer and to also secure an increase in the secondary or welding current.

A further object of the invention is to provide an improved welding system employing a three phase-three winding welding transformer and which consists in the addition of a transfer transformer connected in parallel therewith whereby to increase the thermal rating of the welding transformer, to increase the secondary welding current of the same, and to also reduce the commutation time. Since current is continuously flowing in all the transformer windings, thus tending to equalize inductive and resistive voltage drops in different windings, more rapid commutation results.

Another object of the present invention resides in the provision of a transfer transformer as an economical solution of the problem of limited production due to insufficient primary heat capacity. Also in cases where space is at a premium, such as in portable welders, a considerable reduction in volume and weight can be obtained by employing a transfer transformer.

With these and various other objects in view, the invention may consist of certain novel features of construction and operation as will be more fully described and particularly pointed out in the specification, drawings and claims appended hereto.

In the drawings which illustrate an embodiment of the invention and wherein like reference characters are used to designate like parts—

Figure 1 is a wiring diagram illustrating the circuit connections for the primary windings of a three-phase welding transformer;

Figure 2 is a wiring diagram illustrating the circuit connections with a transfer transformer connected in parallel with the primary windings of a three-phase welding transformer such as shown in Figure 1;

Figure 5 is a simplified schematic wiring diagram of Figure 4 with the electric discharge valves omitted;

Figure 6 is a schematic wiring diagram of a single phase system illustrating the phenomenon on which the invention is based;

Figure 7 is a graph which illustrates the increase in secondary current output for a welding transformer when combined with a transfer transformer as against a welding transformer only;

Figure 8 is a reproduction of actual oscillograms for the secondary current and tube and line voltages for a three-phase welding transformer such as shown in Figure 1 without transfer transformer;

Figure 3:
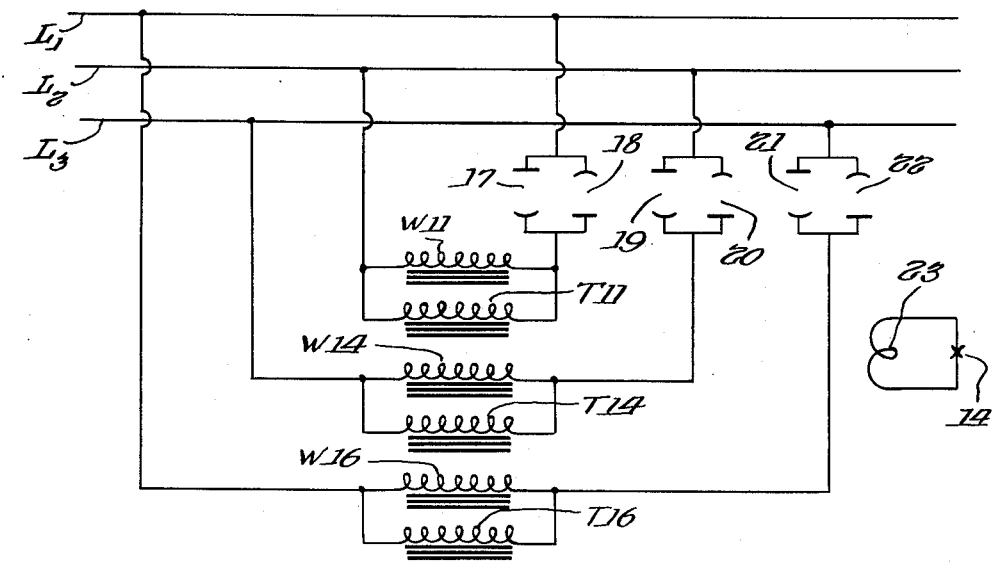
Figure 3 is another schematic wiring diagram further illustrating the primary windings of a welding and transfer transformer connected in parallel relation according to the present invention.

Figure 9 is a reproduction of actual oscillographs for the secondary current and tube and line voltages for two like transformers in parallel, one comprising the welding transformer and the other the transfer transformer; and Figure 10 is a reproduction of oscillographs of the secondary current and tube and line voltages for two unlike transformers in parallel, the transfer transformer being larger than the welding transformer.

Referring to Figure 1, which illustrates a converter system such as shown in Patent No. 2,431,083, previously mentioned, the welding transformer generally indicated by numeral 10 consists of a plurality of primary windings and a secondary winding. More particularly, the welding transformer has three primary windings, which are individually connected to a phase of the three-phase source of supply represented by terminals $L_1$, $L_2$, and $L_3$. The winding 11 is connected by conductors 12 and 13 to the leads $L_1$—$L_2$. The winding 14 is connected by conductors 13 and 15 to the leads $L_2$—$L_3$, whereas, primary winding 16 is connected by conductors 12 and 15 to leads $L_1$—$L_3$. Each primary winding may comprise a number of windings connected in series and for illustrative purposes two such windings are shown with the electric discharge valves being located therebetween. For example, with respect to the primary winding 11, the same consists of windings 11a and 11b connected in series with the electric discharge valves 17 and 18. Primary winding 14 consists of windings 14a and 14b, with the electric discharge valves 19 and 20 located therebetween. In a similar manner primary winding 16 consists of windings 16a and 16b with electric discharge valves 21 and 22 connected between and in series therewith. Numeral 23 indicates the secondary or welding circuit of the transformer 10 and which welding circuit may have electrical connection through suitable electrodes with the workpiece 24, as will be clearly understood in the welding art.

In operation of the welding transformer 10 a group of electric discharge valves such as 17, 19 and 21 are rendered conductive. The iron core of the welding transformer 10 is magnetized by unidirectional pulses of energy which flow through the primary windings for a controlled period of time, resulting in a unidirectional impulse of energy in the secondary circuit. The electric discharge valves are rendered nonconductive for a controlled period of time and then a magnetizing force is applied again but in an opposite direction by rendering the second group of valves namely, 18, 20 and 22, conductive, resulting in another unidirectional impulse of energy in the secondary circuit, which, however, is opposite in polarity from the first impulse. This sequence may be repeated as many times as required. It will be understood that the pulses of energy flowing through the windings comprises either the positive or negative half cycles of current from the alternating polyphase source and that such pulses flow through the windings in accordance with the phase relation of the electromotive forces in said supply source.

In the transformer of Figure 1 each phase winding is energized consecutively. In the case of a single phase system with a two winding transformer each winding would be energized approximately half of the time. In the case of a polyphase system with a transformer having "N" windings, each winding would be energized approximately 1/Nth of the time. Accordingly, energy is drawn off each phase of the power system consecutively and the energy drawn off as regards any one primary winding is in pulses and is not continuous.

In accordance with the invention it is proposed to employ a transfer transformer in combination with a welding transformer such as shown in Figure 1, for example, and as a result of the combination the operating characteristics of the welding transformer are materially improved. For example, the loading of each phase of the power system is still consecutive but the loading of each phase winding of the welding transformer is continuous and all transformer windings carry current simultaneously. Figure 2 illustrates by way of a schematic wiring diagram a three phase-three winding welding transformer with a transfer transformer connected in parallel therewith. The alternating current supply source is indicated by the leads $L_1$, $L_2$ and $L_3$. The windings of the welding transformer carry the same numerals as in Figure 1, although they are preceded by the letter W in order to distinguish the windings from those of the transfer transformer which are preceded by the letter T. Primary winding W11 is connected by conductors 12 and 13 to leads $L_1$—$L_2$, and in a manner as described with transformer 10 a pair of electric discharge valves is connected in series relation with primary winding W11. For the transfer transformer primary winding T11 is in parallel with W11, the circuit connections therefor being schmatically illustrated in Figure 2. The primary winding W14 for the welding transformer is in parallel with the primary winding T14 for the transfer transformer with conductors 13 and 15 connecting the same to leads $L_2$—$L_3$. The windings W16 are similarly connected in parallel with windings T16 and which are connected by conductors 12 and 15 to leads $L_1$—$L_3$. Numeral 23 represents the secondary or welding circuit for the welding transformer and which may be electrically connected to workpieces such as 24.

Figure 3 is another schematic wiring diagram of a three phase-three winding transformer having a transfer transformer connected in parallel therewith. The circuit connections are the same as in Figure 2 although somewhat simplified since the primary windings are not divided for the location of the electric discharge valves therebetween. The source of alternating polyphase current is indicated by leads $L_1$, $L_2$ and $L_3$. For primary winding W11 the same is connected in series with its pair of electric discharge valves 17 and 18 and the circuit is connected by conductors to leads $L_1$—$L_2$. The winding T11 of the transfer transformer is connected in parallel with winding W11.

In a similar manner primary winding W14 is connected to its pair of electric discharge valves 19 and 20 and to leads $L_2$—$L_3$, with winding T14 having parallel connection with W14. Also primary winding W16 is connected to its pair of electric discharge valves 21 and 22 with the circuit being connected to leads $L_3$—$L_1$. Winding T16 is connected in parallel with W16. The secondary or welding circuit for the welding transformer is designated by numerals 23 and 24 and indicates the workpiece electrically connected in the welding circuit.

The following table indicates the operation of the apparatus shown schematically in the wiring diagrams of Figures 2 and 3:

| Transformer Winding | Source of Energy | | |
|---|---|---|---|
| Loaded phase | $L_1$–$L_2$ | $L_2$–$L_3$ | $L_3$–$L_1$ |
| W11 | $L_1$–$L_2$ | T11 | T11 |
| W14 | T14 | $L_2$–$L_3$ | T14 |
| W16 | T16 | T16 | $L_3$–$L_1$ |
| T11 | $L_1$–$L_2$ | T14 | T16 |
| T14 | T11 | $L_2$–$L_3$ | T16 |
| T16 | T11 | T14 | $L_2$–$L_1$ |

Figure 6 is a simplified version of Figures 2 and 3 and may be used to describe the phenomenon on which the present invention is based. For a single phase indicated by $L_1$—$L_2$ and considering only the condition existing during a half cycle time of alternating current, it will be understood that W26 will be the normally loaded winding of transformer W, which is the welding transformer, being directly coupled to the secondary winding 28 connected to workpieces 29. The winding W27 constitutes the normally non-loaded winding of the welding transformer but which is electrically connected to the transfer transformer indicated by T through winding T27. The winding T27 is magnetically coupled to winding T26 and which winding is energized from leads $L_1$—$L_2$ since it is in parallel with W26. In operation of the schematic structure, as shown, winding W26 will directly energize the secondary winding 28. Winding T26 directly energizes T27, which in turn energizes W27 connected thereto. The latter winding W27 supplies energy to the secondary 28 of the welding transformer. Without the transfer transformer winding W27 would not be loaded.

Figure 4:
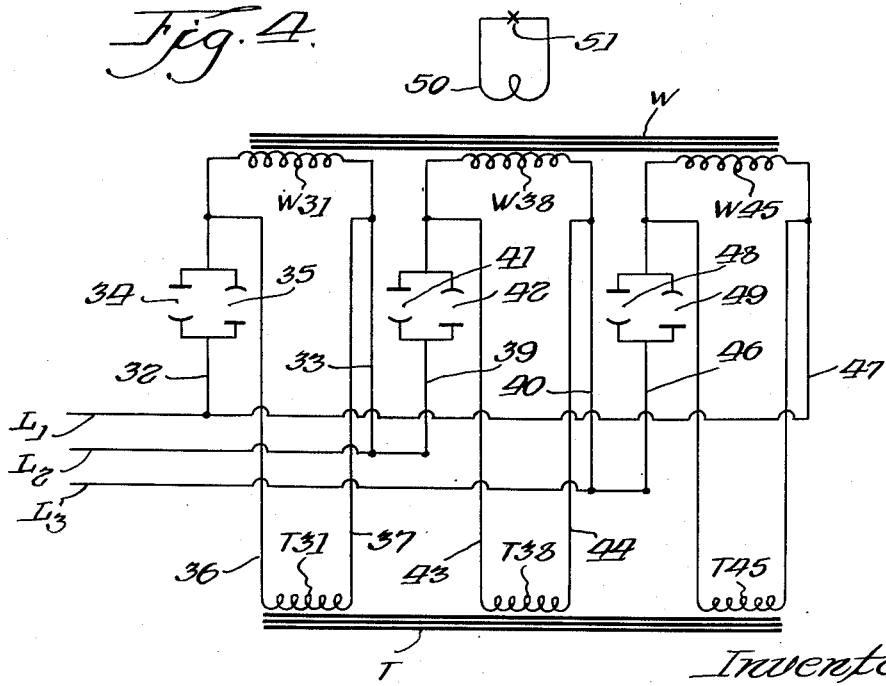
Figure 4 is another schematic wiring diagram of a three-phase welding transformer having parallel circuit connections with a transfer transformer.

It is entirely possible, and at times may be desirable, to locate the transfer transformer some distance from the welding transformer. Attention is directed to Figure 4 which illustrates such a condition by means of a schematic wiring diagram, which is essentially the same as Figures 2 and 3. The polyphase source of alternating current is indicated by leads $L_1$, $L_2$, $L_3$. The welding transformer, indicated by W, is provided with primary windings 31, 38 and 45. Conductors 32 and 33 connect winding W31 to leads $L_1$—$L_2$, and it will be observed that conductor 32 has interposed therein a pair of electric discharge valves 34 and 35 connected in back to back relation. The primary winding T31 is connected in parallel with W31 by means of the conductors 36 and 37. The length of the conductors 36 and 37 may be such that the transfer transformer can be located at some distance from the welding transformer. The second primary winding W38 is connected by conductors 39 and 40 to leads $L_2$—$L_3$, and the electric discharge valves 41 and 42 are interposed in conductors 39, the valves being connected to each other in back to back relation. For the transfer transformer T38 is connected to W38 by the conductors 43 and 44. In a similar manner the third primary winding of the welding transformer, namely, W45, is connected by conductors 46 and 47 to leads $L_3$—$L_1$ with conductor 46 having interposed therein the electric discharge valves 48 and 49. The secondary circuit of the welding transformer consists of a winding 50 and which is electrically connected by suitable electrodes to the workpieces 51.

It is possible to make a relatively simple analysis of the circuit of Figure 4, if the electric discharge valves are eliminated. Such a circuit is shown in Figure 5. It must be understood that the system is continuously rotating since only one phase is operative at a time. For example, assuming phase $L_1$—$L_2$ is operative to supply a positive half cycle of current, due to the conductivity of valve 34, then windings W31 and T31 would be energized by this pulse of current. Since W31 is magnetically coupled to the secondary or welding circuit 50, it energizes the secondary circuit directly. However, the energy fed into T31 is magnetically transferred to T38 and to T45 since all three windings are magnetically coupled through the iron core of the transfer transformer. Also T38 is connected to W38 and similarly T45 is connected to W45. The energy thus received by W38 and W45 will be magnetically transferred to secondary 50 and it is this function which results in a higher secondary or welding current being induced in winding 50. The process above described is continuous with the three phases rotating and each in turn becoming the primary source of power. For example, phase $L_2$—$L_3$ will become operative 120 degrees later when valve 41 becomes conductive, and following another 120 degree interval, phase $L_3$—$L_1$ will become operative when valve 48 becomes conductive.

As previously stated, only one phase of the polyphase source is operative at a time except during the period of commutation, which is the period of overlap as regards the conductivity of the various electric valves. For example, valve 41 will become conductive before valve 34 dies out and also valve 48 becomes conductive before valve 41 dies out. The transfer transformer functions to reduce the commutation period since it acts to snuff out each valve prior to the time it ordinarily would become nonconductive as a result of its particular phase current reaching zero.

The advantages resulting from the use of a transfer transformer can best be described in connection with actual oscillograms such as shown in Figures 8, 9 and 10. Oscillographic measurements were made of a three-phase transformer such as shown in Figure 1. Similar oscillographic measurements were made of two similar transformers, namely, a welding and a transfer transformer connected in parallel and of two unlike transformers connected in parallel, a large transfer transformer being employed whose primary resistance was approximately ten per cent that of the welding transformer. All measurements were made with shorted electrodes and with no phase retard, or, in other words, with 100% heat setting.

Figures 8, 9 and 10 are oscillograms of a single transformer, the two like transformers and the two unlike transformers, respectively, and includes the secondary currents, and the valve and line voltages. It will be noted that the secondary current wave form improves as the size of the transfer transformer is increased. With the single transformer, Figure 8, there are no stored energy pulses as occur with respect to Figures 9 and 10. Stored energy is primarily a function of the secondary current magnitude since L and N are constant. This was substantiated by introducing phase retard to reduce the output of the systems employing a transfer transformer to the same value as that of the single transformer system, as shown in Figure 8. When the output was so reduced, the stored energy disappeared. Stored energy will appear if the term $$\frac{Ndi}{Ldt}$$

is greater than $Ep$, where $Ep$ is the instantaneous voltage across the conducting phase, L is the inductance of the secondary circuit and the leakage inductance of the primary referred to the secondary, N is the turn ratio, and $$\frac{di}{dt}$$

is the rate of change of current in the secondary. Although the reactive impedance of the secondary circuit of a three-phase transformer is minimized by a reduction of the secondary frequency, the inductance of the secondary circuit is still very important during the current build-up and current decay of an impulse. By a reduction of the induction, stored energy effects may be reduced and at the same time the rate of rise of current may be increased. This latter improvement is very important in long throat welding machines where a steady state value of welding current may not be reached for as long as six or seven cycles.

Another observation to be made from Figures 8, 9 and 10 is the reduced commutation period which is best noted by the smoother secondary current wave form. The commutation periods were forty-two degrees, thirty-one degrees and twenty degrees for Figures 8, 9 and 10, respectively. With maximum phase retard the commutation period was seventeen degrees for a single transformer and nine degrees when using a large transfer transformer. An advantage to be gained by a reduction of the commutation period is a direct reduction in the duration of the line voltage drop which occurs during commutation. The drop occurs during the commutation period because the two commutating phases add in such a manner as to be one hundred and eighty degrees out of phase with the third phase, and at the same time is impressed across the third phase. The situation then existing is essentially two equal voltages in series which produce a line current limited only by the various resistances and reactances of the welding transformer, the distribution transformer, and the transmission line. Fortunately, most of the line disturbance caused by the commutation is filtered out by the time that it is reflected back through the distribution transformer.

A transfer transformer permits an increase in the thermal rating of the primary windings of a welding transformer by a factor which approaches two in the case of a single phase system and by a factor approaching "N" in the case of a polyphase system, where "N" represents the number of transformer phase windings. This occurs since the rating of the transformer is determined by its losses and ability to dissipate heat. The effective welding currents of a converter type transformer, as shown in Figure 1, is approximately $$\frac{I}{\sqrt{N}}$$

where I represents the line currents. However, with the addition of the proper transfer transformer the phase welding current becomes $$\frac{I}{N}$$

The ratio of winding currents is $$\frac{I\sqrt{N}}{\frac{I}{N}}$$

or the $\sqrt{N}$, which means that without the transfer transformer the winding currents are greater by a factor of $\sqrt{N}$. Heating is an $I^2$ function. Therefore, the heating of a converter transformer without the transfer transformer is $(\sqrt{N})^2$ or "N" times greater.

An increase in thermal rating may be utilized in cases where space occupied by the welding transformer is at a premium. The mass of the primary windings can be reduced. The transfer transformer can be placed some distance from the welding transformer where space is available. The increased primary rating may also be used to advantage in cases where transformers in the field are being used in excess of rating. The addition of a transfer transformer would not be as expensive as the replacement of the welding transformer.

Also by employing a transfer transformer the secondary welding current of the welding transformer can be materially increased. This is due to a reduction in the IR drop in the primary of the welding transformer. This increase may be as much as twenty-five per cent. Here again the application of such a transfer transformer could be to a machine already in the field and where an increase in welding current would be desirable.

What is claimed is:

1. In a three-phase converter system for welding, in combination, a welding transformer including an iron core, three primary windings on the iron core connected to each other in delta relation, circuit means connecting each winding to its respective phase of a three-phase alternating current source, a welding circuit including a secondary winding on said iron core and having inductive relation with the primary windings, at least one electric discharge valve in series circuit relation with each primary winding for controlling unidirectional current flow through the winding, a transfer transformer in electrical connection with the welding transformer whereby to improve the operating characteristics of the welding transformer and increase the value of the welding current, said transfer transformer including a separate iron core with three windings only on the last mentioned iron core in inductive relation with each other, and said electrical connection including other circuit means for each winding of the transfer transformer electrically connecting the winding in parallel relation to a respective primary winding of the welding transformer.

2. In a polyphase low frequency system for welding, the combination with a source of polyphase alternating current, of an inductive device including an iron core, primary windings corresponding in number to the phases of the alternating current source in associated relation with the iron core, a welding circuit including a secondary winding on the iron core in inductive relation with the primary windings, circuit means including conductors electrically connecting the terminals of each primary winding to their respective phase of the polyphase alternating current source, at least one electric discharge valve in the circuit means of each primary winding in series therewith for controlling flow of unidirectional current impulses through the winding, a transfer transformer in electrical connection with the inductive device whereby to improve the operating characteristics of the welding transformer and increase the value of the welding current, said transfer transformer including a separate iron core with primary windings only on the last mentioned iron core in inductive relation with each other, and said electrical connection including other circuit means for each winding of the transfer transformer electrically connecting the winding in parallel relation to the respective primary winding of the inductive device.

3. In a three-phase converter system for welding, in combination, a welding transformer including an iron core, three primary windings on the iron core connected to each other in delta relation, circuit means including conductors electrically connecting the terminals of each primary winding to their respective phase of a three-phase alternating current source, a welding circuit including a secondary winding on the iron core in inductive relation with the primary windings, a pair of electric discharge valves connected in back to back relation and interposed in each circuit means in series with the primary winding thereof for controlling flow of unidirectional current impulses through the winding, means for improving the operating characteristics of the welding transformer in addition to increasing the value of the welding current comprising a transfer transformer, said transfer transformer consisting of primary windings only on a separate iron core so that the windings are in inductive relation with each other, and other circuit means for each winding of the transfer transformer electrically connecting the winding in parallel relation to a respective primary winding of the welding transformer.

4. In a three-phase low frequency system for welding, the combination with a three-phase source of alternating current, of a welding transformer including an iron core, three primary windings on the iron core in inductive relation with each other, circuit means connecting each primary winding across its respective phase of the source, a pair of electric discharge valves connected in back to back relation and interposed in each winding in series circuit relation therewith for controlling flow of unidirectional current through the winding, whereby the electric discharge valves comprise two groups according to direction of current flow with each group having a valve in each winding, means rendering the groups of electric discharge valves alternately conductive for energizing the windings sequentially from the alternating current source, a welding circuit including a secondary winding also on said iron core in inductive relation with the primary windings, a transfer transformer having windings corresponding respectively to those of the welding transformer, a separate iron core for the transfer transformer and with which the windings of the same are inductively associated, and circuit means for each winding of the transfer transformer and which electrically connects the winding in parallel with its respective primary winding of the welding transformer, whereby the transfer transformer improves the operating characteristics of the welding transformer and materially inceases the value of the welding current.

5. In an alternating current system of the character described, the combination with a source of alternating current, of a main transformer including an iron core, at least two primary windings on the iron core in inductive relation with each other, a load circuit including a secondary winding on the iron core in inductive relation with the primary windings, circuit means electrically connecting each primary winding to said alternating current source, means for energizing the windings sequentially from the alternating current source including a pair of electric discharge valves in each circuit means connected in back to back relation and in series with its respective primary winding, said electric discharge valves controlling flow of unidirectional current impulses through the winding, a transfer transformer in electrical connection with the main transformer whereby to improve the operating characteristics of the main transformer and increase the value of the current induced in the secondary winding, said transfer transformer including a separate iron core having only primary windings thereon in inductive relation with each other, and said electrical connection including other circuit means for each winding of the transfer transformer electrically connecting the winding in parallel relation to a respective primary winding of the main transformer.

6. In an alternating current system of the character described, wherein a source of alternating current is electrically connected to a main transformer consisting of an iron core having at least two primary windings thereon in inductive relation with each other, a load circuit including a secondary winding also on the iron core on inductive relation with the primary windings, and wherein electric discharge valves are provided in the circuit of each primary winding for energizing the windings sequentially from the alternating current source, the improvement consisting in a transfer transformer having electrical connection with said main transformer to improve the operating characteristics of the main transformer and to increase the value of the current induced in the secondary winding, said transfer transformer consisting of primary windings only having inductive relation with each other on a separate iron core and being equal in number to the primary windings of the main transformer, and said electrical connection including other circuit means for each primary winding of the transfer transformer electrically connecting the winding in parallel relation to a respective primary winding of the main transformer.

FRED W. JAKSHA.

References Cited in the file of this patent
UNITED STATES PATENTS

| Number | Name | Date |
|---|---|---|
| 2,089,860 | Rypinski | Aug. 10, 1937 |
| 2,374,930 | Gray | May 1, 1945 |
| 2,431,083 | Sciaky | Nov. 18, 1947 |
| 2,489,697 | Brandt, Jr. | Nov. 29, 1949 |

OTHER REFERENCES

Transformer Reference Book, vol. 1, pages 13–18, Allis-Chalmers, Milwaukee.